(12) United States Patent
Hondroulis et al.

(10) Patent No.: US 10,072,357 B2
(45) Date of Patent: Sep. 11, 2018

(54) BANANA FIBER COMPOSITE MATERIAL

(71) Applicant: GEOPHIA LLC, Atlanta, GA (US)

(72) Inventors: Dimitrios G. Hondroulis, Atlanta, GA (US); William W. Gorman, Atlanta, GA (US)

(73) Assignee: GEOPHIA, LLC, Atlanta, GA (US)

( * ) Notice: Subject to any disclaimer, the term of this patent is extended or adjusted under 35 U.S.C. 154(b) by 299 days.

(21) Appl. No.: 14/907,338

(22) PCT Filed: Jul. 23, 2014

(86) PCT No.: PCT/US2014/047822
§ 371 (c)(1),
(2) Date: Jan. 25, 2016

(87) PCT Pub. No.: WO2015/013409
PCT Pub. Date: Jan. 29, 2015

(65) Prior Publication Data
US 2016/0168753 A1 Jun. 16, 2016

Related U.S. Application Data

(60) Provisional application No. 61/858,305, filed on Jul. 25, 2013.

(51) Int. Cl.
*D01B 1/22* (2006.01)
*D01B 1/10* (2006.01)
(Continued)

(52) U.S. Cl.
CPC .............. *D01B 1/22* (2013.01); *B29B 7/905* (2013.01); *B29B 15/08* (2013.01); *C08K 7/02* (2013.01);
(Continued)

(58) Field of Classification Search
None
See application file for complete search history.

(56) References Cited

U.S. PATENT DOCUMENTS 3,154,464 A    10/1964  Doosselaere
4,028,030 A *   6/1977  Imhof .................... B01J 2/20
                                                           425/135
(Continued)

OTHER PUBLICATIONS

Sokhansanj, S. "combined Grinding and Drying of Biomass in One Operation Phase I", 2008 (Year: 2008).*
(Continued)

*Primary Examiner* — Mary Lynn F Theisen
(74) *Attorney, Agent, or Firm* — Nelson Mullins Riley & Scarborough LLP

(57) ABSTRACT

A system and method for producing bio composite materials by mixing pelletized plant fiber dust and virgin or recycled plastic. The system may comprise a reducer, a press, a dryer, a pelletizer, and a mixer. The reducer separates the fibers of the plant material and the press removes liquid from the separated fibers. The dryer further reduces the moisture content of the pressed fibers and generates dust which is extracted by sifting, screening, or another suitable method. The pelletizer compresses and/or treats the fiber dust with solutions, adhesives, or other processes that cause the fiber dust to adhere together. The fiber dust pellets are then mixed with virgin or recycled plastic to produce a bio composite material.

20 Claims, 3 Drawing Sheets

(51) Int. Cl.
  *B29B 9/08*   (2006.01)
  *B29B 7/90*   (2006.01)
  *B29B 15/08*  (2006.01)
  *C08K 7/02*   (2006.01)
  *D01B 1/48*   (2006.01)
  *B29B 9/14*   (2006.01)

(52) U.S. Cl.
  CPC .............. *D01B 1/10* (2013.01); *D01B 1/48* (2013.01); *B29B 9/14* (2013.01)

(56) References Cited

U.S. PATENT DOCUMENTS

| | | | |
|---|---|---|---|
| 5,513,805 A * | 5/1996 | Fisher | B07B 1/20 |
| | | | 209/23 |
| 5,958,182 A | 9/1999 | Hondroulis et al. | |
| 6,074,587 A | 6/2000 | Liu et al. | |
| 9,272,468 B1 * | 3/2016 | Ileleji | A01N 25/002 |
| 2007/0141178 A1 | 6/2007 | Empie et al. | |
| 2009/0229771 A1 | 6/2009 | Warnes et al. | |
| 2013/0310489 A1 * | 11/2013 | Gass | C08J 5/045 |
| | | | 524/9 |

OTHER PUBLICATIONS

International Search Report and Written Opinion of PCT/US2014/047822 dated Oct. 24, 2014, all enclosed pages cited.

* cited by examiner

BANANA FIBER COMPOSITE MATERIAL

TECHNICAL FIELD

Example embodiments generally relate to the generation of composite materials, and more particularly relate to the use of banana fibers and/or dust for combination with plastic materials to form composite materials.

BACKGROUND

There are a number of tropical plants that produce fruit or other useful foodstuffs. These types of plants are popular for harvesting, and thus cultivation of such plants is common. However, with the exception of the fruit itself, the majority of the material associated with harvesting the fruit of these plants is generally considered to be waste material. Accordingly, the fibrous stalks of such plants are often disposed of in landfills or in other manners that are either not beneficial for the environment or, in some cases, may actually harm the environment. Although some of the discarded plant matter may be used as natural fertilizer, there may be still more uses for the fibrous stalks of some such plants.

Banana stalks are one example of a tropical plant that has a fibrous stalk that is often wasted. In this regard, the banana stalk dies after the fruit is produced and harvested, and it is common for the stalks, which are typically cut off to harvest the bananas, to be thrown away. These fibrous stalks of the banana tree and some other tropical plants can have as much as 93% to 96% of their weight comprised of water and natural latex content that may include a variety of resinous and gummy substances. Accordingly, in order to produce workable or useable fibers, the fibrous material must be cleaned and processed. In particular, much of the fluid within the stalks must be removed, and the latex or other natural resinous substances must also be extracted or washed out.

There have been a number of different processing methods developed for processing fibers of banana stalks to obtain useful materials. These processing methods may generate banana fiber dust, which may otherwise be a byproduct that would be disposed of and therefore generate waste. Thus, it should be appreciated that it may be desirable to develop a processing technique that can provide for some beneficial use for the banana fiber dust.

BRIEF SUMMARY OF SOME EXAMPLES

Accordingly, some example embodiments may enable the provision of an apparatus, system and method for obtaining beneficial use of banana fiber dust generated by processing banana tree fibers. In this regard, some embodiments may provide for a banana fiber bio composite material that uses banana fiber dust in combination with plastics.

Example embodiments are directed to systems and methods for producing bio composite materials by mixing pelletized plant fiber dust and virgin or recycled plastic. The system may comprise a reducer, a press, a dryer, a pelletizer, and a mixer. The reducer separates the fibers of the plant material and the press removes liquid from the separated fibers. The dryer further reduces the moisture content of the pressed fibers and generates dust which is extracted by sifting, screening, or another suitable method. The pelletizer compresses and/or treats the fiber dust with solutions, adhesives, or other processes that cause the fiber dust to adhere together. The fiber dust pellets are then mixed with virgin or recycled plastic to produce a bio composite material.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
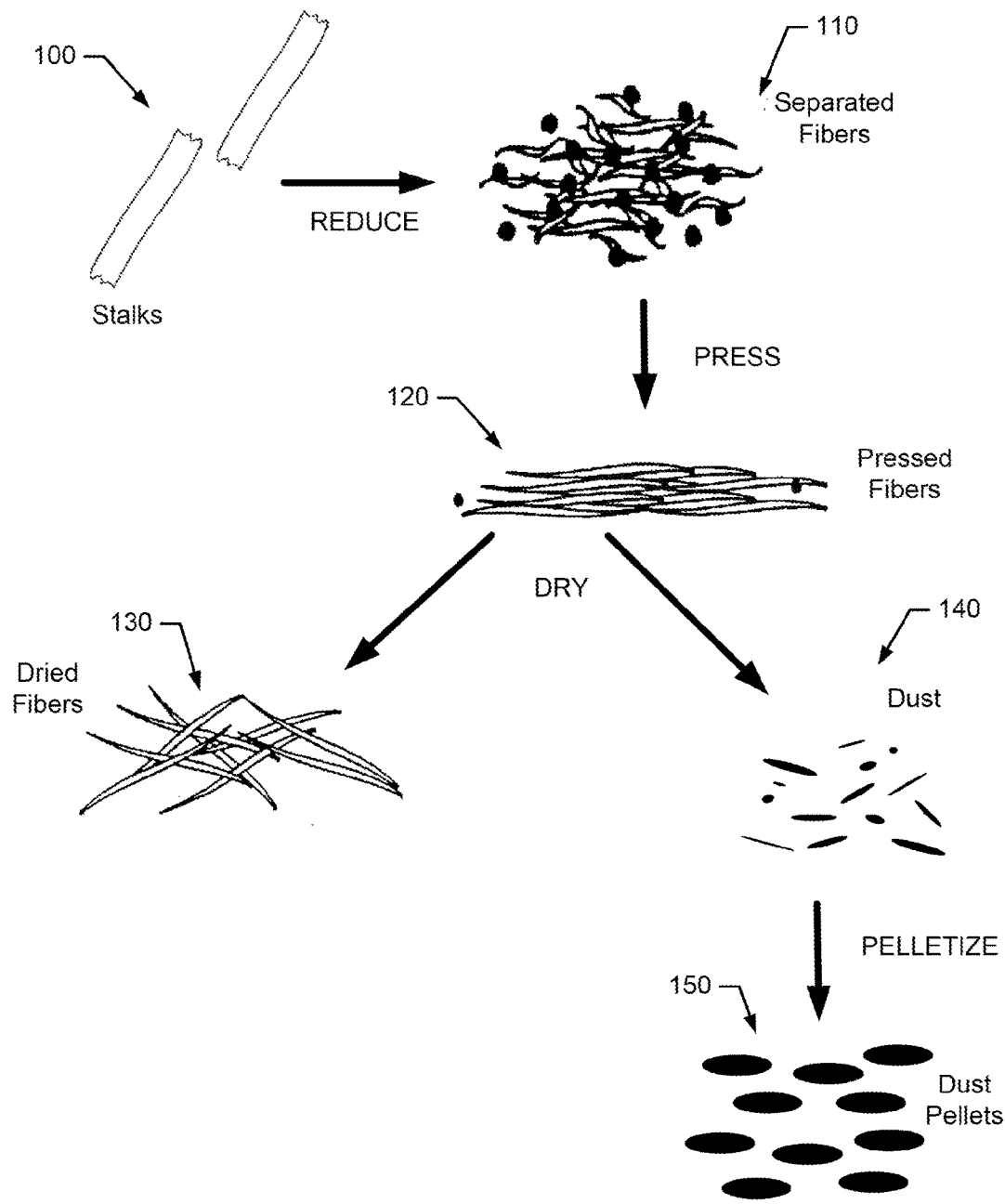
FIG. 1 illustrates a diagram of the states of materials associated with a process for producing a banana fiber bio composite material according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Some example embodiments may enable the provision of a process for converting the banana fiber dust, generated while otherwise processing stalks of a banana tree into useful fibers, into composite materials. Banana fiber dust may be generated during the drying process involved in processing banana fibers for use in the absorbent materials or other uses. The dust may be separated by screening, sifting or otherwise separating small fibers or particles that are considered to be too small for use in connection with generation of absorbent materials (i.e., dust particles) and then optionally pelletizing the dust particles so they can be combined with either virgin or recycled plastics to form composite materials. The ratios used to mix or combine the dust particles (whether pelletized or not) and the plastic materials may vary in certain examples. However, the banana fiber dust tends to retain its flexural strength when combined in this manner and therefore provides a composite material having increased tensile strength, relatively high toughness, and reduced cost. Thus, added strength with reduced part weight and cost may be achieved for components made from this composite material due to the preservation of the characteristics of the banana fiber in the banana fiber dust and/or pellets. Preservation of the characteristics of the banana fiber within such composite materials may also allow for a unique, natural appearance of the parts generated therefrom while maintaining a smooth, glossy finish.

FIG. 1 illustrates a diagram of the states of materials associated with the process. In this regard, banana stalks 100 may be employed in connection with some embodiments. The banana stalks 100 may be obtained, for example, after fruit has been removed from the stalks, leaving the banana stalks 100 as a byproduct of the harvesting process. The banana stalks 100 may then be reduced into separated fibers 110. The separated fibers are then pressed to generate pressed fibers 120 that have a relatively high percentage of the excess natural resinous substances removed therefrom. In this regard, for example, water, latex and other natural juices within the fibers may be removed while forming the pressed fibers 120. The pressed fibers 120 may then be dried to reduce the moisture levels of the fibers and produce dried fibers 130. The dried fibers 130 may be employed, for example, in the context of generating materials or fabrics that have absorbent properties with respect to oil.

The drying process may generate banana fiber dust 140 as a byproduct thereof. In an example embodiment, the dried fibers 130 may have at least a minimal length as determined by a sifting, screening or other separation process. Meanwhile, the banana fiber dust 140 may be comprised of the remnant particles that are too small to be used as dried fibers 130. In some cases, the banana fiber dust 140 may range in size from one micron up to about one inch long. After the banana fiber dust 140 is separated, the banana fiber dust 140 may optionally be processed to pelletize it into dust pellets 150. The dust pellets 150 may be formed by compressing the banana dust fibers 140 and/or by exposing the banana dust fibers 140 to solutions, adhesives or processes that may cause the banana dust fibers 140 to adhere to one another to form pellets. The dust pellets 150 or the banana fiber dust 140 itself may then be used for combination with plastic materials as described herein.

Figure 2:
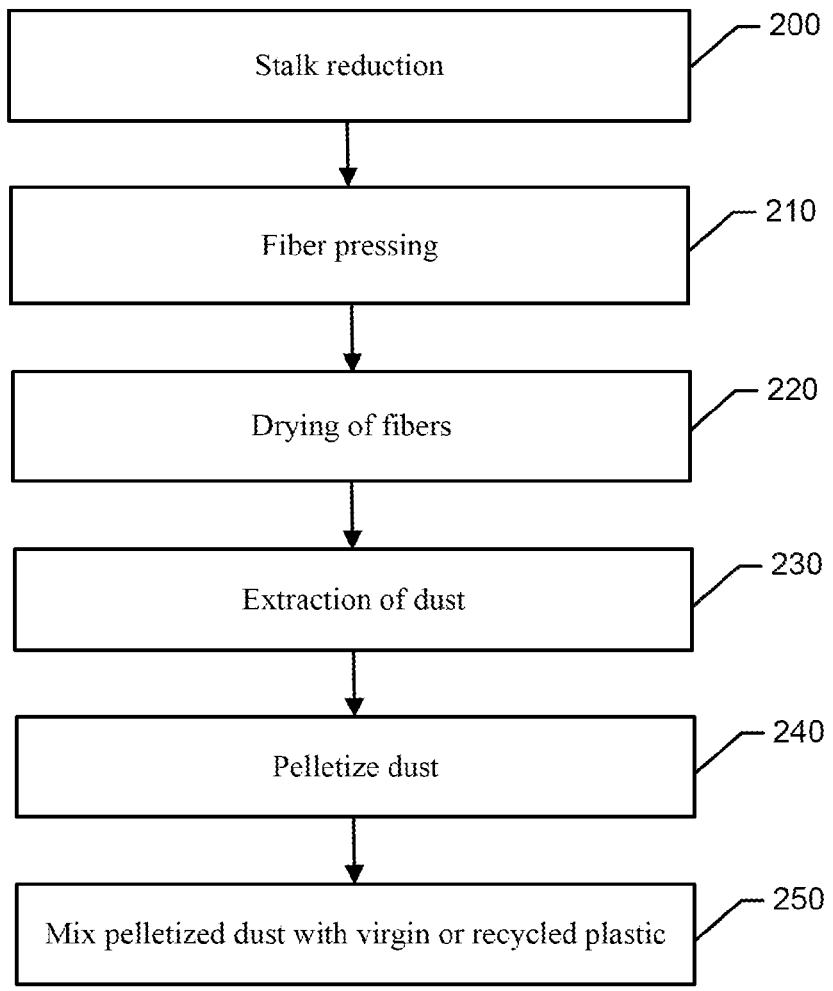
FIG. 2 illustrates a block diagram of a method for producing a banana fiber bio composite material according to an example embodiment.
Figure 3:
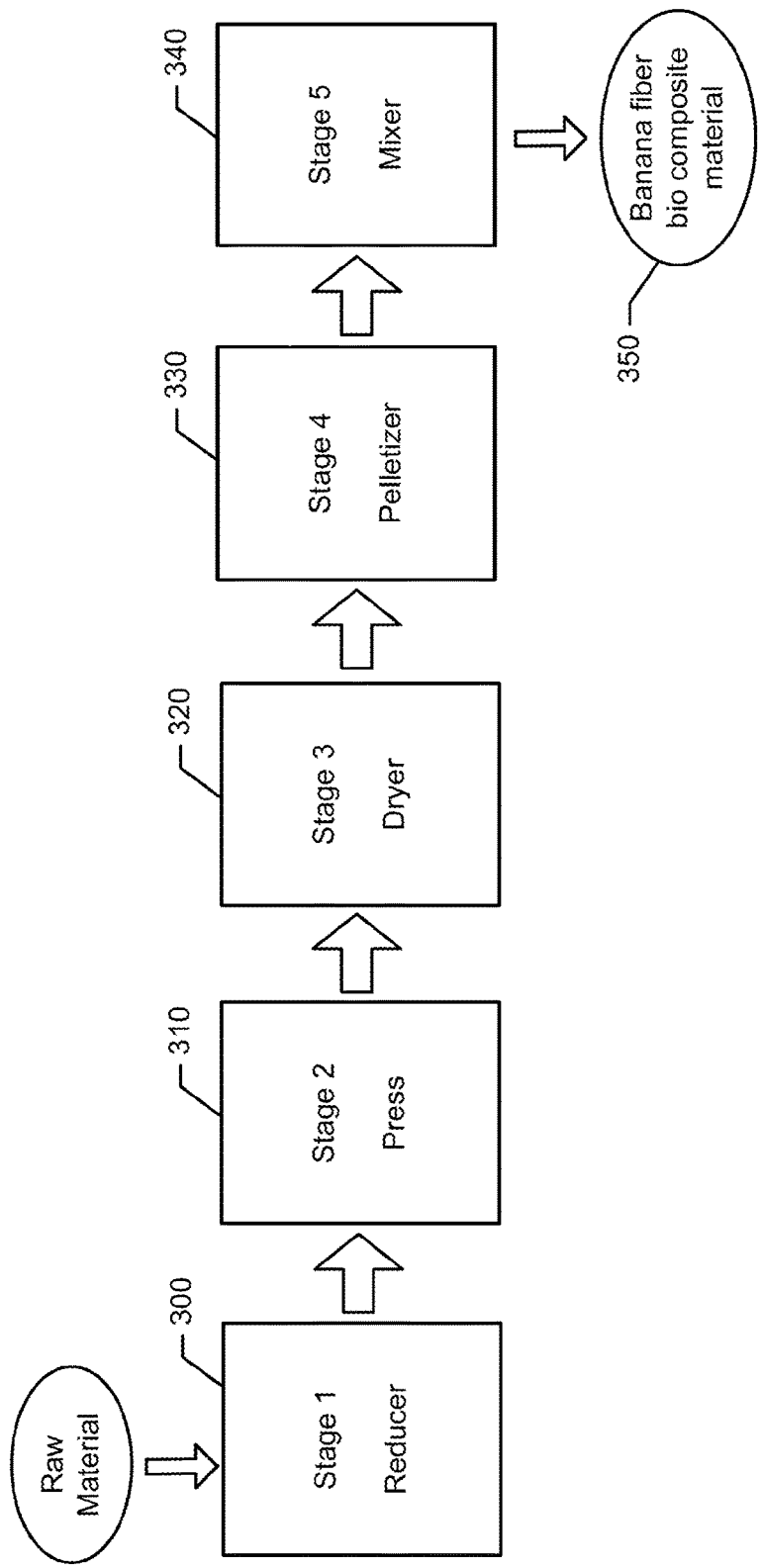
FIG. 3 illustrates a block diagram representing the equipment and corresponding processing stages associated with the method for producing a banana fiber bio composite material in accordance with an example embodiment.

FIG. 2 illustrates a block diagram of a method of processing the material through the states shown in FIG. 1, and further for combining the dust pellets generated in FIG. 1 with plastic materials to form a bio composite material. FIG. 3 illustrates a block diagram showing the equipment involved in each stage or operation of the process of FIG. 2. An example embodiment will now be described in reference to FIGS. 1 to 3. In this regard, as shown in FIG. 2, the banana tree stalks 100 may be the raw material that is initially reduced (e.g., to form the separated fibers 110) at operation 200. Stalk reduction may include any or all of the operations of cutting the stalks and grinding, shredding or otherwise processing the stalks to separate the fibers therein. The separated fibers are naturally hydrophobic.

The stalk reduction of operation 200 may be performed as a first stage process in a reducer 300. The reducer 300 may include a bladed roller that draws the banana tree stalks 100 into a series of rotating knives or blades. The rotating knives or blades may then cut the stalks into pieces that may have any desirable length while separating the fibers. The fibers may then be propelled through a grinder neck before being passed along to a press 310. Although the separated fibers 110 could be washed at this stage, an example embodiment may be practiced without washing the separated fibers 110 in order to reduce the cost, energy consumption and time of processing. Although not required, washing of fibers may be performed to facilitate removal of latex and/or fluids in the separated fibers 110. The washing may be accomplished using water alone, or may further include the addition of a solution including potassium hydroxide, hydrogen peroxide, sodium hydroxide or the like.

At operation 210, the separated fibers 110 may be pressed in the press 310 for second stage processing. The press 310 may be a hydraulically operated press, screw press, belt press, or any other suitable pressing device. In an example embodiment, pressing of the separated fibers 110 at operation 210 may remove a high percentage of excess natural resinous substances (e.g., latex), water, juice and/or other liquids from the separated fibers 110 to produce the pressed fibers 120, which may have a water and natural liquid content of about 43% to about 48% by weight. Thus, a reduction from greater than 90% moisture content by weight to about ½ that amount may be achieved via the press 310. The pressing operation may remove the naturally resinous substances (e.g., latex) in a manner that opens the natural capillaries in the fiber when the latex and other fluids are extracted.

In an example embodiment, the separated fibers 110 may be transferred to the press 310 from the reducer 300 by hand or by a conveyor device that extends between the reducer 300 and the press 310. Similarly, the pressed fibers 120 from the press 310 may be transported to the next stage (i.e., the drying stage) by a conveyor device or by hand. In some cases, the conveyor device may incorporate agitation paddles or other means by which to further separate or aerate fibers and to facilitate drying both while the fibers are transported and when the fibers undergo further processing.

In some embodiments, the third stage processing may include drying of fibers at operation 220 using a dryer 320. The drying may be accomplished by passing the pressed fibers 120 through the dryer 320, which may employ heating, agitating, aerating and/or other drying methods that are used to reduce the moisture content of the fibers in order to generate the dried fibers 130. In some cases, the moisture content after pressing may be in the neighborhood of 43% to 48%, and the moisture content of the dried fibers 130 may be reduced to less than about 10%. In some embodiments, the dryer 320 may employ non-thermal, kinetic disintegration, pulverization that may be provided, for example, by a kinetic disintegration system (KDS). As such, in some embodiments, the dryer 320 may be embodied as a non-thermal, kinetic disintegration, pulverization device.

Extraction of dust may then be accomplished at operation 230 using sifting, screening or any other suitable separation method to separate dust particles (i.e., banana fiber dust 140) having a size from about one micron to about one inch, from the dried fibers 130. The banana fiber dust 140 may then be pelletized at operation 240 using the pelletizer 330. The pelletizer 330 may be configured to compress and/or treat the banana fiber dust 140 in order to facilitate adhesion of the dust particles to each other to form dust pellets 150.

At stage 5, a mixer 340 may be employed to mix the dust pellets 150 (or the banana fiber dust 140) with virgin or recycled plastic at operation 250 in order to generate banana fiber bio composite material 350. The mixing ratios for plastic and dust pellets 150 may vary according to the desired characteristics for the banana fiber bio composite material 350. However, according to one example embodiment, a ratio of 50% banana fiber dust to 50% virgin or recycled plastic has been shown to generate a composite material having good flexural strength. In some embodiments, relatively long dust fibers (e.g., up to about 1 inch) may be provided in injection molded thermo-plastics to provide high strength and relatively low weight composite material-based components.

Thus, according to an example embodiment, a process for producing a banana fiber bio composite material, is provided. As a result of employing the process, dust particles that would otherwise be considered to be waste may be pelletized and mixed with plastic materials to generate composite materials that retain the natural flexural strength of banana fibers while combined in a unique composite structure. Although some embodiments may employ virgin plastic materials, the fact that some alternative embodiments may generate the composite materials by using recycled plastic materials means that some embodiments may almost entirely employ materials that would otherwise be considered waste.

An example embodiment of a system for producing a plant fiber bio composite material may therefore include: a reducer for separating fibers of the plant material; a press for pressing the fibers and removing liquids from the plant material; a dryer for reducing the moisture content of the pressed fibers and generating plant fiber dust; a pelletizer for forming pellets from the plant fiber dust; and a mixer for mixing the dust pellets with virgin or recycled plastic. The reducer may separate the fibers by cutting, grinding, shredding, or otherwise processing the plant material and may comprise a bladed roller that draws plant material into a series of rotating cutting implements to separate the fibers. The reducer may further comprise a grinder neck through which the plant material fibers are delivered to the press. The separated plant material fibers may be washed to facilitate the removal of latex or other liquids prior to being delivered to the press. A system of conveyors may be used to transfer separated fibers from the reducer to the press and may incorporate agitation paddles or other means to further separate or aerate the fibers. The dryer may employ heating, agitating, aerating, or other drying methods to reduce the moisture content of the pressed fibers. For example, the dryer may employ a non-thermal, kinetic disintegration, pulverization device to further process the pressed fibers. Plant fiber dust may be extracted from the pressed fibers using sifting, screening, or any other suitable method of separating dust particles from the plant fibers. A pelletizer may compress and/or treat the plant fiber dust with solutions, adhesives, or processes that cause the fiber dust to adhere together. A mixer may generate a bio composite material comprising equal portions of plant fiber dust and virgin or recycled plastic.

Another example embodiment may include a method for producing a plant fiber bio composite material comprising: reducing plant material to form separated fibers of a desired length; pressing the separated fibers to remove liquids; drying the pressed fibers to reduce moisture content and generate plant fiber dust; pelletizing the plant fiber dust; and mixing the fiber dust pellets with virgin or recycled plastic. Reducing plant material to form separated fibers may comprise cutting, grinding, shredding, or otherwise processing the plant material. The plant material may be reduced by using a bladed roller to draw plant material into a series of rotating cutting implements and delivering the plant material fibers to the press through a grinder neck. The method may further comprise washing the plant material fibers to facilitate the removal of latex or other liquids prior to being delivered to the press. The separated fibers may be transferred from the reducer to the press using a system of conveyors, which may further include agitation paddles to further separate or aerate the fibers. The pressed fibers may be dried by heating, agitating, aerating, or other drying methods to reduce the moisture content of the pressed fibers. For example, the method may include drying pressed fibers using a non-thermal, kinetic disintegration, pulverization device to further process the pressed fibers. While drying the pressed fibers, plant fiber dust may be extracted by sifting, screening, or any other suitable method. Extracted plant fiber dust may be compressed and/or treated with solutions, adhesives, or processes that cause the fiber dust to adhere together. A bio composite material may be generated by mixing equal portions of plant fiber dust pellets and virgin or recycled plastic.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A system for producing a plant fiber bio composite material comprising:
   a reducer for separating fibers of the plant material;
   a press for pressing the fibers and removing liquids from the plant material;
   a dryer for reducing the moisture content of the pressed fibers and generating plant fiber dust;
   a pelletizer for forming pellets from the plant fiber dust; and
   a mixer for mixing the dust pellets with virgin or recycled plastic.

2. The system of claim 1, wherein the reducer separates the fibers by cutting, grinding, shredding, or a combination thereof.

3. The system of claim 2, wherein the reducer comprises a bladed roller that draws plant material into a series of rotating cutting implements to separate the fibers.

4. The system of claim 2, wherein the reducer comprises a grinder neck through which the plant material fibers are delivered to the press.

5. The system of claim 1, wherein the separated plant material fibers are washed to facilitate the removal of latex or other liquids prior to being delivered to the press.

6. The system of claim 1, wherein the plant material comprises banana stalks.

7. The system of claim 1, wherein a system of conveyors is used to transfer separated fibers from the reducer to the press.

8. The system of claim 7, wherein the system of conveyors incorporates agitation paddles to further separate or aerate the fibers.

9. The system of claim 1, wherein the dryer employs heating, agitating, aerating, or a combination thereof to reduce the moisture content of the pressed fibers.

10. The system of claim 1, wherein the dryer employs a non-thermal, kinetic disintegration, pulverization device to further process the pressed fibers.

11. The system of claim 1, wherein plant fiber dust is extracted from the pressed fibers using sifting, screening, or a combination thereof.

12. The system of claim 1, wherein the pelletizer compresses and/or treats the plant fiber dust with solutions, adhesives, or processes that cause the fiber dust to adhere together.

13. The system of claim 1, wherein the mixer generates a bio composite material comprising equal portions of plant fiber dust pellets and virgin or recycled plastic.

14. A method for producing a plant fiber bio composite material comprising the steps of:
- reducing plant material to form separated fibers of a desired length;
- pressing the separated fibers to remove liquids;
- drying the pressed fibers to reduce moisture content and generate plant fiber dust;
- pelletizing the plant fiber dust; and
- mixing the fiber dust pellets with virgin or recycled plastic.

15. The method of claim 14, wherein the step of reducing plant material to form separated fibers comprises cutting, grinding, shredding, or a combination thereof.

16. The method of claim 15, wherein the step of reducing plant material to form separated fibers comprises using a bladed roller to draw plant material into a series of rotating cutting implements.

17. The method of claim 15, wherein the step of reducing plant material to form separated fibers comprises delivering the plant material fibers to the press through a grinder neck.

18. The method of claim 14, further comprising the step of washing the plant material fibers to facilitate the removal of latex or other liquids prior to being delivered to the press.

19. The method of claim 14, wherein the plant material comprises banana stalks.

20. The method of claim 14, further comprising the step of transferring the separated fibers from the reducer to the press using a system of conveyors.

* * * * *